No. 826,827. PATENTED JULY 24, 1906.
G. W. BLAIR.
METHOD OF MAKING TILES.
APPLICATION FILED MAR. 25, 1905.

3 SHEETS—SHEET 1.

WITNESSES
Thomas W. Bakewell
R. H. Balderson.

George W. Blair INVENTOR

No. 826,827. PATENTED JULY 24, 1906.
G. W. BLAIR.
METHOD OF MAKING TILES.
APPLICATION FILED MAR. 25, 1905.

3 SHEETS—SHEET 2.

WITNESSES
Thomas W. Bakewell
R. H. Balderson

George W. Blair, INVENTOR

No. 826,827. PATENTED JULY 24, 1906.
G. W. BLAIR.
METHOD OF MAKING TILES.
APPLICATION FILED MAR. 25, 1905.

3 SHEETS—SHEET 3.

UNITED STATES PATENT OFFICE.

GEORGE W. BLAIR, OF PITTSBURG, PENNSYLVANIA.

METHOD OF MAKING TILES.

No. 826,827.　　Specification of Letters Patent.　　Patented July 24, 1906.

Application filed March 25, 1905. Serial No. 251,990.

*To all whom it may concern:*

Be it known that I, GEORGE W. BLAIR, of Pittsburg, Allegheny county, Pennsylvania, have invented a new and useful Method of Making Tiles, of which the following is a full, clear, and exact description, reference being had to the accompanying drawings, forming part of this specification, in which—

Figure 1:
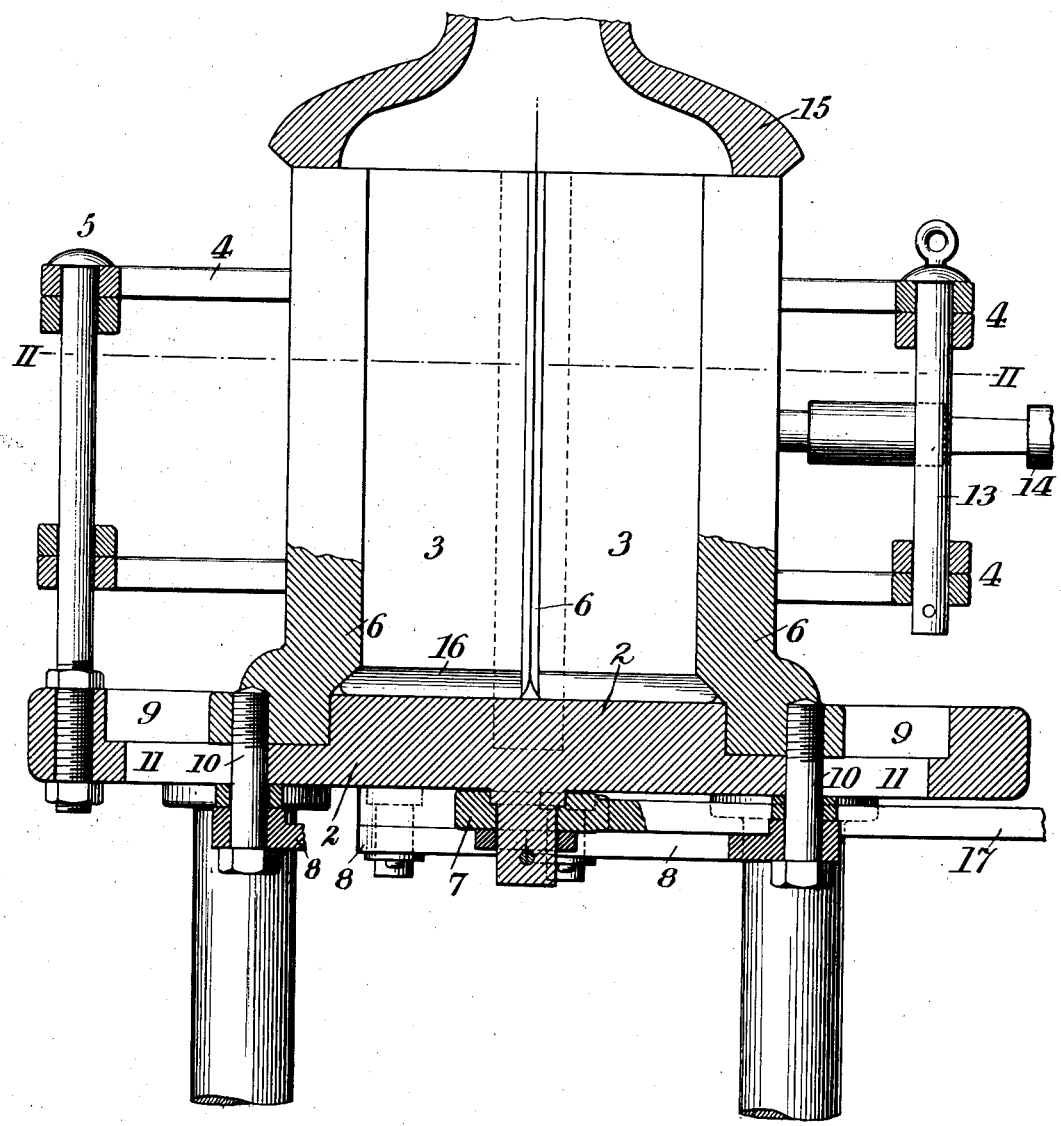
Figure 2:
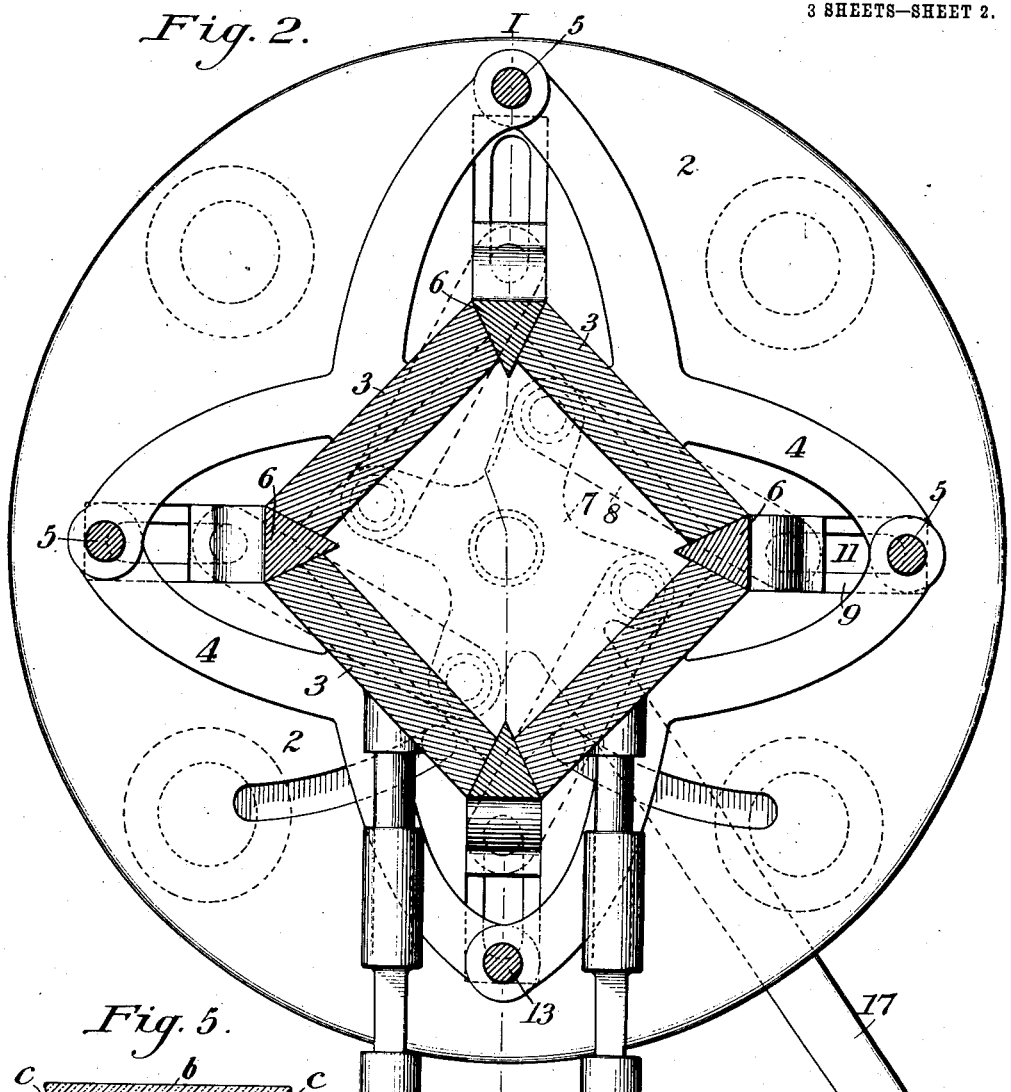
Figure 5:
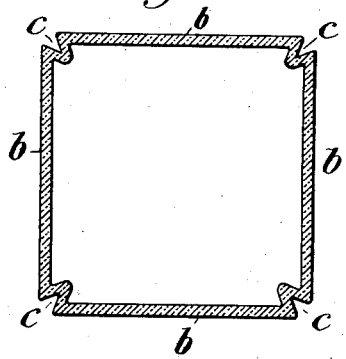
Figure 6:
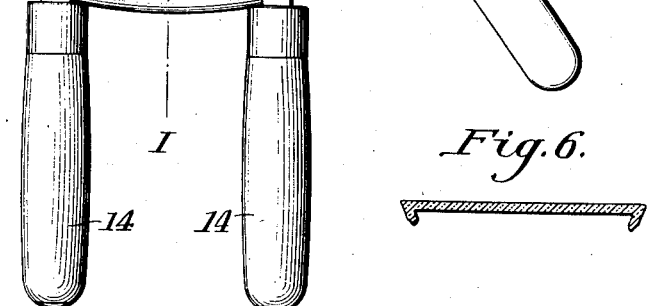
Figure 3:
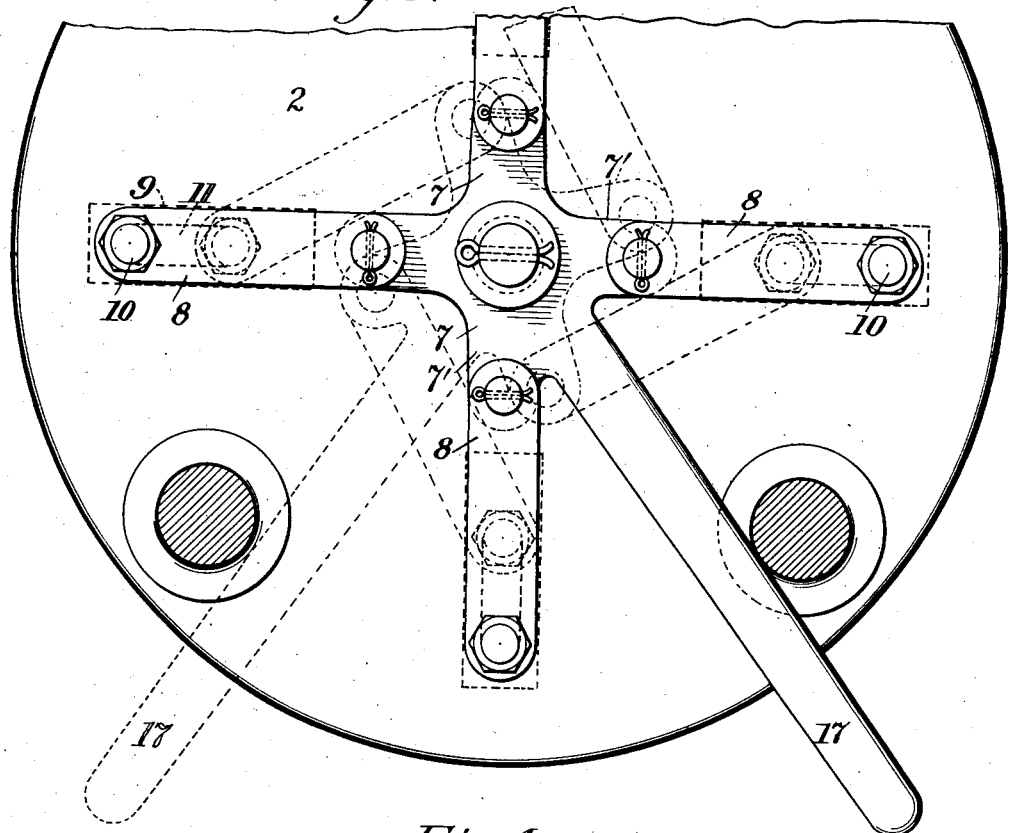
Figure 4:

Figure 1 shows in vertical section, partly in elevation, a mold adapted for the practice of my invention. Fig. 2 is a horizontal section on the line II II of Fig. 1. Fig. 3 is a bottom plan view of the bottom plate of the mold. Fig. 4 is a detail view showing a modified apparatus for operating the parts of the mold; and Figs. 5 and 6 are sectional views showing, respectively, the blank which is made by my invention and one of the tiles which is divided from the blank.

Heretofore glass tiles have been made commercially either by pressing the tiles in suitable molds or by blowing a hollow cylinder, flattening it, and then dividing it into tiles of suitable size. Tiles have also been made by rolling a sheet of glass and dividing it into suitable sizes; but prior to my invention I know of no successful method of making blown-glass tiles which do not need to be subsequently flattened, and my invention provides efficient means by which this is done.

In the practice of my invention I employ a mold adapted to form a hollow blank having flat sides and divide the blank thus formed at the angles so as to constitute, preferably, as many tiles as there were sides to the blank. I also preferably use in conjunction with such mold a movable device by which the tiles are provided with undercut portions adapting them to obtain a firm hold on the mortar or cement with which they are placed on the walls.

In the drawings, 2 represents the base-plate of the mold. The mold itself comprises several side pieces or plates 3 3, of which I show four in the drawings. These plates 3 3 are fixed to arms 4 4, which are hinged together at points 5, so that the sides of the mold can be closed together to form a cavity of polygonal cross-section or can be opened for the purpose of releasing the blank after it has been blown. The inner corners of the sides or plates 3 3 preferably do not meet, but afford intermediate cavities, preferably of substantial triangular form, and in these cavities are adapted to work sliding pieces 6 6, which when projected into the cavities, as shown in Fig. 2, form angular projections on the interior of the mold against which the glass will shape itself so as to form lips at the angles of the glass blank, and when the pieces are retracted they are disengaged from the glass blank and then afford no obstruction to the free opening of the parts of the mold. I may use any suitable means for projecting and retracting these pieces 6. In Fig. 3 I show a device for that purpose consisting of a rotary plate 7, having arms 7', which constitute, in effect, bell-crank levers, and these arms are connected by links 8 8 with the sliding pieces 6, which, as shown in Fig. 1, are mounted in radial grooves 9 in the bottom plate of the mold. The connection between the links 8 and the sliding pieces 6 is preferably made of vertical bolts 10, which also move in slots 11 below the slots 9.

In the modification shown in Fig. 4 I employ a rotary plate $7^a$, having cam-grooves 12, adapted to engage the ends of links connected with the sliding pieces 6, so that by rotating the plate $7^a$ at the appropriate time the cam-grooves will cause the reciprocation of the pieces 6.

In the practice of my invention I close the parts of the mold so as to bring it into the position shown in Figs. 1 and 2, and I may hold the sections together by means of a pin 13, or they may be held together by the mold-boy, who grasps the handles 14. A blow-over section 15 is then placed on the top of the mold and a gathering of glass is introduced into the mold and is blown therein, thus forming a blank of the cross-sectional shape shown in Fig. 5, having a blow-over at the top formed by the mold portion 15 and a blow-over at the bottom formed by a flaring portion 16 at the base of the mold-cavity. This blank has flat sides $b$, and at the corners it has inwardly-indented portions $c$, which are formed by the ends of the movable sections 6. When the blank has thus been blown, the sections 6 are retracted by turning the plate 7 by means of its hand-lever 17, and the molded parts which are then free to be opened are retracted from the blank. The blank is then removed, the blow-over at its ends are cracked off in the usual way, and the blank is then divided into four pieces by cutting it on the lines of the indented portions *c* at the corners.

As the glass is chilled somewhat along the indented portions at the corners, I preferably reheat the blank before dividing it into the tiles. This may be easily carried out by placing the blank in a glory-hole furnace, which will not only serve to soften the hardened glass at the corners and make the cutting easier, but also serves to give a fire-polish to the surface of the tiles. I thus improve the appearance at the same time that the glass is improved for cutting. I also prefer to pass the blank through the annealing-leer before it is cut into tiles. The blow-overs may or may not be present when the blank is passed through the leer, and by annealing the blank as a whole the tiles act to support each other and prevent warping in the leer. If the blanks were broken or cut apart before annealing, they wold be liable to warping and injury in the leer. This annealing of the blank before the tiles are severed therefrom I believe to be new and desire to cover it whether the reheating is carried out or not. By these operations I form four tiles of the shape shown in Fig. 6, each of which is a flat piece of glass having marginal lips which are adapted to be held by the cement and is ready for use without any further flattening.

My invention is distinctive in that the tiles are blown against finishing-surfaces—that is to say, surfaces which give the final form and finish to the tiles. My invention thus enables me to blow a number of tiles at one operation, and as they are all of uniform size and shape and do not need any treatment further than the severing of the individual tiles from the blank the manufacture is very cheap and rapid, enabling a large output to be produced. The indentations at the corners of the blank enable it to be divided into pieces with ease and great accuracy.

The invention enables me to make tiles much lighter than can be made by pressing and yet with all the advantages of uniformity and cheapness which the method of pressing affords. It also produces a tile having a much better and more highly polished surface than can be produced by pressing or rolling. By making the tiles in this way I also avoid the difficulties of warping of the glass which are incident to other processes of manufacture.

I claim—

1. The method of making tiles, consisting in inserting a gathering of glass into a mold, expanding the glass against finishing-surfaces extending at an angle to each other, and then dividing the hollow blank along the lines of the corner portions; substantially as described.

2. The method of making tiles, consisting in inserting glass within a mold, blowing it in hollow form against finishing-surfaces of the mold, and simultaneously indenting the corner portions, and then severing the tiles along the indented portions; substantially as described.

3. The method of making tiles, which consists in blowing a hollow blank against finishing-surfaces at an angle to each other and forming indented portions in the blank by means of a forming-surface, retracting the forming-surface from the indented portions, then releasing the blank from the mold and dividing it; substantially as described.

4. The method of making glass blanks, which consists in expanding a hollow blank against finishing-surfaces with blow-overs at the ends and with flat sides, then removing the blow-overs and dividing the tiles from the blank; substantially as described.

5. The method of making tiles, consisting in blowing a hollow blank against angular finishing-surfaces, removing and reheating the blank, and then dividing it into tiles; substantially as described.

6. The method of making tiles, consisting in blowing a hollow blank against angular finishing-surfaces, annealing the blank, and thereafter dividing the blank into tiles; substantially as described.

7. The method of making tiles, consisting in blowing a hollow blank against angular finishing-surfaces, reheating the blank, annealing the blank, and then dividing the blank into tiles; substantially as described.

In testimony whereof I have hereunto set my hand.

GEORGE W. BLAIR.

Witnesses:
JOHN MILLER,
H. M. CORWIN.